Aug. 17, 1965     R. J. NORMAN ETAL     3,201,042
RELAY VALVE
Filed June 11, 1962     3 Sheets-Sheet 1

INVENTORS.
Robert J. Norman,
BY Wesly L. Taylor,
Byron, Hume, Drown & Clement
Attys.

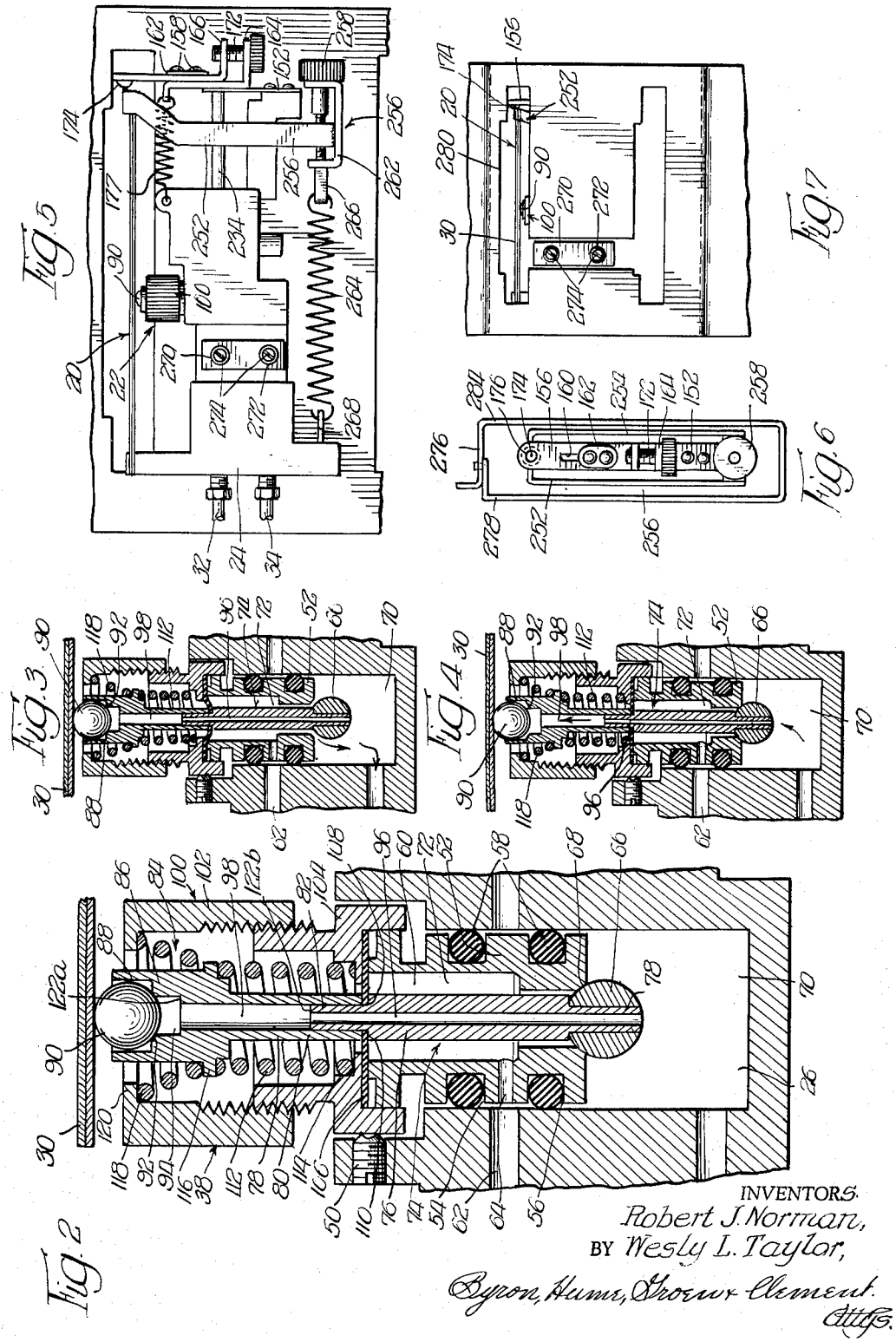

Aug. 17, 1965
R. J. NORMAN ETAL
3,201,042
RELAY VALVE
Filed June 11, 1962
3 Sheets-Sheet 3
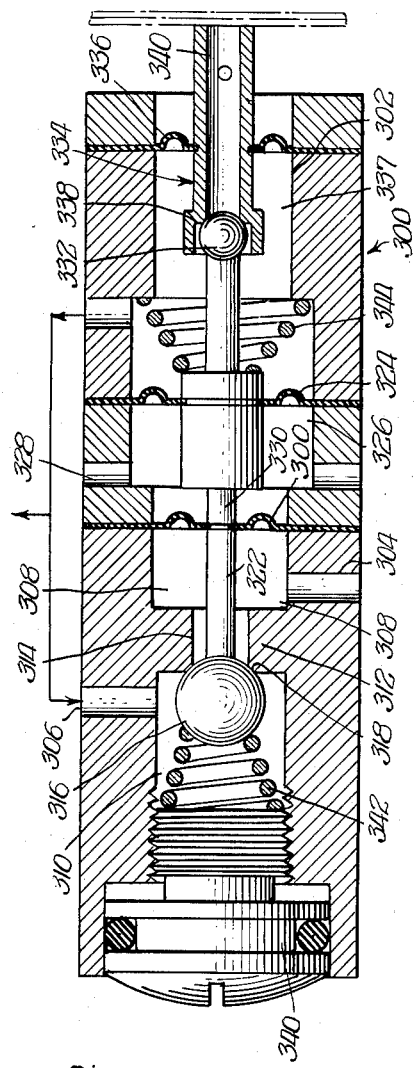
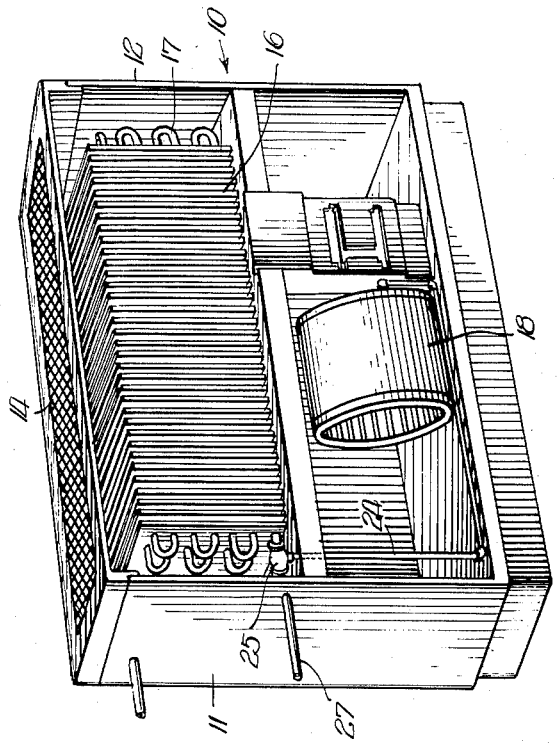
INVENTORS
Robert J. Norman,
BY Wesly L. Taylor,
Byron, Hume Irown + Clement.
Attys.

United States Patent Office 3,201,042
Patented Aug. 17, 1965

3,201,042
RELAY VALVE
Robert J. Norman, Chicago, and Wesley L. Taylor, Glenview, Ill., assignors to The Powers Regulator Company, Skokie, Ill., a corporation of Illinois
Filed June 11, 1962, Ser. No. 201,600
4 Claims. (Cl. 236—1)

This invention pertains to a valve or relay and in particular to a valve or relay especially adapted to generate a pneumatic signal upon actuation by some condition sensing device. One example of an environment in which such a device could be used is an air conditioning system. In such a system the ambient atmosphere in a specified area is heated or cooled by means of heat exchanger and a heat exchange medium constituting either a heated or cooled fluid. The supply of the heat exchange medium is regulated by means of an appropriate valve that may be remotely controlled by a pneumatic signal generated in accordance with the sensed temperature of air. The subject invention is especially adapted to be utilized in conjunction with a temperature sensing means such as a bimetal, Bourdon tube, charged bellows or bulb or the like to generate a signal directly proportional to the temperature of the air or, more specifically, the deviations of the temperature from some desired level.

One type of relay which is found throughout the prior art generally embodies a double valve construction which utilizes a flexible diaphragm for supporting one of the valves and is adapted to sense the control pressure or that pressure which is used in driving the valve used for regulating the flow of the heat exchange fluid. The double valve construction performs satisfactorily in many instances and is characterized as having a built-in feed back, a relatively high volume capacity and a confined air system in which there is only intermittent bleed to atmosphere. However, such relays generally have at least two characteristics which can be a serious disadvantage. The first stems from the face that the diaphragm construction requires relatively large forces to actuate the same so that it is impossible to utilize it in conjunction with sensing devices that generate a signal of relatively small magnitude. The second, which is somewhat related to the first and probably the more serious of the two, is the inherent imbalance of forces in the relay. The imbalance of forces results in a "dead band" in which there can be a change in temperature as sensed by the sensing element and an appropriate change in force exerted by the latter but no corresponding change in the signal generated by the relay. Such a "dead band" can constitute a range of several degrees in either or both sides of the control temperature before the relay will make an appropriate correction as indicated by the temperature means.

One of the reasons for the imbalance of forces in the prior art relays of the type described above is the fact that the supply pressure is directed onto one of the valves in such a manner that the valve is biased or driven into its seated position. Such force as generated by the supply is normally opposed to that force generated by the condition sensing means. However, only a portion, if any, of the force generated by the supply pressure is sensed by the condition sensing means with the remainder of such force being absorbed by the valve seat. The force absorbed by the valve seat, in a sense, constitutes a preload on the valve, which must be overcome by the condition sensing means before the valve is ever lifted from its seat. Only after the valve is lifted from its seat is the control or signal pressure generated by the relay changed. Thus, the condition sensing means could sense a substantial change in temperature but because of the preload on the valve member never lift the same from its seat to make a corrective change in the control pressure and in turn the temperature.

It will be noted that, in order to indicate to the sensing means that an appropriate signal has been generated in response to the temperature variations, the control pressure is normally sensed in such a way to constitute a feed back. When the valve is at equilibrium the force generated by the sensing means is equal and opposite to the feed back force. Generally it is not practical to let the sum of the forces generated by the supply pressure and the control pressure to constitute the feed back force for reasons well known to those skilled in the art, and accordingly need not be discussed herein. Thus the supply pressure force which is likewise opposing in direction to that force imposed by the sensing means would create an imbalance of forces which the sensing means must overcome in addition to the feed back force, in order to vary the output signal generated by the valve.

As will be seen hereinafter, the subject invention eliminates the condition of imbalance as described hereinbefore so that when in equilibrium the only force sensed by the sensing means is that generated by the feed back. The forces exerted by the supply pressure are essentially balanced so that they have little or no effect upon the operation of the relay.

It is to be noted, however, that there are certain types of relays which are, in essence, balanced and have enjoyed widespread usage. Such type of relay is commonly referred to as a flapper nozzle in which a pivoted lever is arranged in cooperation with a bleed nozzle. The bleed nozzle is connected to a suitable source of air pressure through a suitable pneumatic restrictor and by moving the lever in and out of engagement with the end of the nozzle, the pressure in the system is varied. The movement of the lever may be affected by means of any suitable condition sensing device such as a bi-metallic element. As a result of their inherent balance of forces, the flapper nozzle is adapted to be used with sensing means which generate signals of small magnitude. The disadvantages of flapper nozzles are its small volume capacity, lack of built-in feed back, and constant air bleed. In order to minimize the air bleed the practice has been to construct the nozzle as small as possible. The difficulty with this approach is that entrained foreign particles can and do clog up the nozzle opening so as to cause a shut down of the system.

The subject invention provides the advantages of the two types of relays discussed hereinbefore and at the same time eliminates their disadvantages. For example, the invention is characterized as having a relatively high volume capacity, a confined air system in which there is only intermittent bleed to atmosphere and as being balanced throughout its range of operation so that it may be actuated by small signal forces and so that it eliminates the so-called "dead band." The relay embodying the invention includes a built-in feed back so that it provides a proportional operation in response to changes in the sensed condition.

The subject invention may be generally characterized as a relay including a casing having a chamber therein. A partition or valve seat means having an aperture therein divides the chamber into two compartments. The first compartment is substantially isolated from the atmosphere and is provided with a port for connecting it to a motor device that directly controls the flow of the heat exchange medium. The second compartment is defined by the casing and a movable wall member and is connected to a source of supply pressure. A movable valve member is adapted to move in an out of engagement with the aperture in the partition for controlling the flow from the second compartment to the first compartment. The valve member and the wall member are connected by suitable mechanical means for simultaneous movement and are constructed so that the effective areas of each that are subjected to the supply pressure are substantially equal and opposite. As a result of such construction, the effects of the supply pressure are substantially eliminated.

In a more specific form the valve member is positioned within the first compartment for cooperation with the aperture. A stem is secured at one end to the valve member and is connected to and extends through the movable wall member. The other end of the stem is provided with a valve seat aperture which is connected to the control pressure or first chamber for exhausting the same to atmosphere. A second valve member is adapted to cooperate with the valve seat aperture so as to control the exhaust from the control pressure chamber. The condition sensing means engages the second valve member so as to drive it and the valve and stem assembly in accordance with the changes in the sensed condition. The second valve member is subjected to the control pressure which constitutes a feed back force and which, in turn, is directed to the condition sensing element.

As stated previously, the subject invention substantially obviates the limtations of the prior art devices. Furthermore, as a result of the unique construction embodying the invention it is possible to substantially increase the magnitude of the ratios between the input and output pressures of the relay since there is no imbalance of force regardless of the magnitude of the supply and control pressures or their relationship to each other.

A foremost feature and object of the invention resides in the provision of a relay in which the forces are substantially balanced when it is in a state of equilibrium.

Another feature and object of the invention resides in the provision of a relay in which the forces generated by the supply pressure are substantially balanced.

Another feature and object of the invention resides in the provision of a relay which may be used in conjunction with sensing devices that generate forces of relatively small magnitude.

Another feature and object of the invention resides in the provision of a non-bleed relay which is especially adapted to be utilized in conjunction with a bi-metallic sensing element.

Another feature and object of the invention resides in the provision of a relay in which there is a limted amount of bleed to the atmosphere and which has a built-in feed back.

Another feature and object of the invention resides in the provision of a relay that is especially suited for use in air conditioning systems.

A still further feature and object of the invention resides in the provision of a relay that is a relatively simple and economical construction and yet is able to control a sensed condition to a high degree of accuracy.

Another feature and object of the invention resides in the provision of a non-bleed type relay in which there is substantially little or no "dead band" and which is highly sensitive to signals generated by the condition sensing device.

These and other features and objects of the invention will be apparent upon reading the specification with regard to the following drawings:

In the drawings:

FIGURE 2 is an enlarged sectional view of the relay embodying the invention;

FIGURES 3 and 4 are sectional views of the relay in different stages of operation;

FIGURE 5 is a front elevational view of the invention as shown in FIGURE 1;

FIGURE 6 is an end view in elevation of the invention shown in FIGURE 1;

FIGURE 7 is a front view in elevation as enclosed in a casing suitable for mounting in an air conditioning unit;

FIGURE 8 is a schematic view of an air conditioning unit system in which the inventive relay could be utilized; and FIGURE 9 is a sectional view of a modification of the invention.

Figure 1:
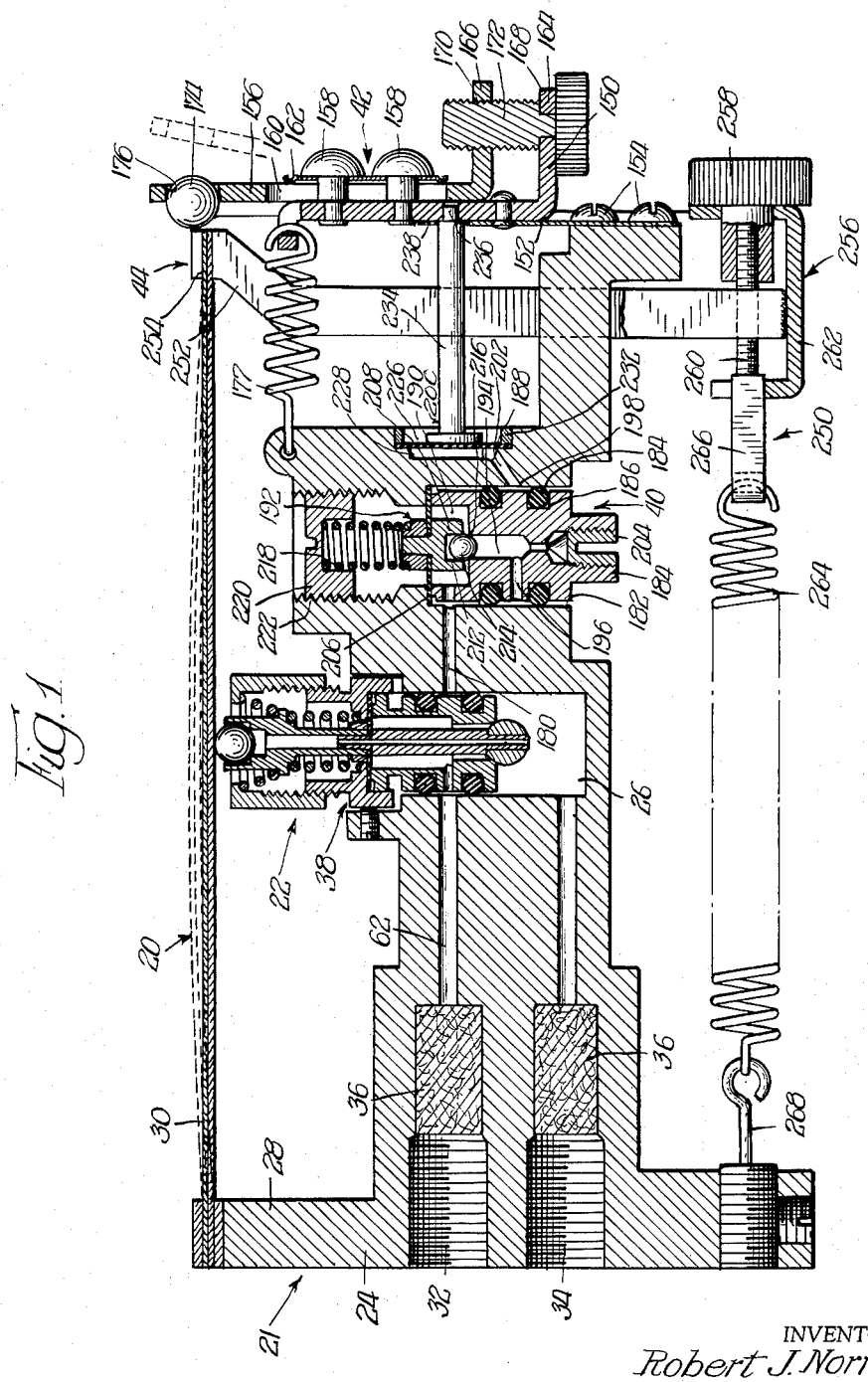
FIGURE 1 is a sectional view of an assembly including the relay embodying the invention as adapted to be utilized in a temperature control system.

The various components of the invention as described hereinafter may be constructed of any suitable material capable of permitting the respective elements of performing in the manner intended. Many of the mechanical or structural elements may advantageously be constructed of metal although they are not limited to such. The sealing members and the flexible diaphragm may be constructed of rubber, plastic or any material which is suitable for this purpose.

For purposes of convenience the subject invention will be described as utilized in an air conditioning system. It will be understood that this is merely by way of example and not a limitation since the invention may be utilized in many types of systems where a pneumatic signal is to be generated as a result of an input signal. Furthermore, the invention can be utilized in systems pertaining to hydraulics as well as pneumatics. Hereinafter, in order to avoid any confusion, particularly with respect to the various valve elements embodied in the invention, the invention will be referred to as a relay although it would be equally correct to refer to it as a valve.

Referring now to FIGURE 8, there is shown a schematic representation of an air conditioning unit in which a relay embodying the invention could be utilized. The system is generally denoted by the numeral 10 and includes a heating and cooling unit 11 comprising a generally rectangular casing 12 having a vent 14 for exhausting air into the room or area which is air conditioned. The unit 11 includes the heat exchanger 16 having the coils 17 which are selectively connected to a source of heating and cooling fluids such as hot or cold water. The unit 11 may include a fan 18 for conveying the air over the coils 17 and out through the vent 14 into the room. A temperature sensing element 20 is mounted at the inlet side of unit 12 for sensing the temperature of air drawn in from the room. The temperature sensing element 20 drives a relay 22 which is mounted within a relay assembly 21 (as shown in FIGURE 1) and which is connected to a source of supply pressure S and is adapted to generate a pneumatic signal in accordance with the temperature sensed by the element 20. The signal is convelyed through an appropriate conduit 24 to a suitable control means such as a motor valve 25 mounted in the supply line 27 connecting the heat exchanger 16 to the source of heat exchange medium. The motor valve 25 regulates the flow through the line 27 into the heat exchanger 16 in accordance with the signal generated by the relay 22 and in turn the temperature sensing element 20.

Referring now to FIGURES 1 and 2 there is shown the relay assembly 21 and relay 22, embodying the invention that may be utilized in the operation of the air conditioning system described above. The assembly 21 includes a casing 24 having a bore or chamber 26 in which the valve assembly 38 is mounted to form the relay 22. The casing 24 is provided with a flange 29 with one end for mounting a bi-metallic sensing element 30. The casing 24 is provided with a supply pressure port 32 and a control pressure port 34 both of which communicate with the chamber 26. A plug of filtering material 36 is mounted in each of the ports 32 and 34 for removing entrained foreign material present in the air utilized in the operation of the system.

A valve assembly 38 is mounted within the bore 26 and is adapted to generate pneumatic signals in accordance with the temperature sensed by the bi-metallic element 30.

The assembly 21 further includes a pneumatic drive assembly 40 which is utilized for converting the air conditioning system for a heating to a cooling operation. Although a brief description of the drive assembly and the bi-metallic element 30 will be given hereinafter, a more complete description of the same may be found in the copending application Serial No. 201,433 filed June 26, 1926 now Patent No. 3,181,788 issued May 4, 1965. The drive assembly is connected to a support assembly 42 which may be selectively used for supporting the end 44 of the bi-metallic element 30. The purpose of the support assembly 42 and the drive assembly is to convert the bi-metallic element 30 from direct acting to reverse acting and vice versa, as will be fully explained hereinafter.

Referring now to FIGURE 2 the relay 22 embodying the invention is shown in detail in which the valve assembly 38 is mounted within the chamber 26. By way of example, it is shown as being secured in place by means of a set screw 50 although other means would be equally suitable.

The valve assembly 38 includes an annular valve body 52 which is received in the chamber 26. The valve body 52 is provided with suitable annular grooves 54 and 56 for receiving sealing members 58 to provide sealing engagement with the walls of the chamber 26. A bore 60 extends along the axis of the valve body 52 and is open at both ends. The bore 60 communicates with the supply pressure port 32 by means of the passages 62 and 64.

A ball type valve 66 is adapted to cooperate with a valve seating surface 68 at one end of the valve body 52 extending around the periphery of the bore 60. The ball valve 66 and the valve body 52 cooperate to divide the chamber 26 into two compartments 70 and 72. As stated previously, the compartment 72 communicates with the supply pressure and will hereinafter be referred to as the supply pressure compartment. The compartment 70 communicates with the motor valve and senses control pressure and hereinafter will be referred to as the control pressure compartment.

A valve stem assembly 74 is connected at one end to the ball valve 66. The valve stem assembly 74 comprises a stem member 76 having a reduced portion 78 at one end thereof which is press fitted into an appropriate bore in the ball valve 66. The stem member 76 is connected to a second stem member 78 which projects from the chamber 26. The stem members 76 and 78 may be coupled in any suitable manner such as a press fit between the telescoping sections 80 and 82. The stem member 78 is provided with a valve assembly 84 at its other end.

The valve assembly 84 is composed of the valve seat housing 86 which is counterbored to form the receptacle 88 for receiving the ball valve member 90. The ball valve member 90 cooperates with a valve seat surface 92 which is formed on the periphery of the aperture 94.

The stems 76 and 78 are provided with the axial passage 96 and 98 which pneumatically connect the control pressure compartment 70 with the valve assembly 84 and the valve seat 92. In this way the compartment 70 may be exhausted to atmosphere by the lifting of the ball valve 90 from its seat 92, as will be fully explained hereinafter.

The valve assembly 84 is mounted within a housing assembly 100 comprising an annular member 102 and cap 104. The cap 104 is threadably secured to the body member 102 as shown in the drawings.

An annular diaphragm 106 is secured intermediate its inner and outer peripheries between the cap 104 and the annular member 52. The diaphragm 106 is provided with an axially positioned aperture 108 which receives the section 82 of the stem member 76. The inner periphery of the diaphragm 106 is clamped between the end of the stem 78 and the shoulder 110 of the stem 76. The diaphragm 106 seals the compartment 72 from the atmosphere so that it is confined except for the outlet at the end thereof that is selectively engaged by the ball valve member 66. The diaphragm 106 is adapted to sense the supply pressure within the compartment 72, as will be explained more fully later on. It will be apparent that means other than the diaphragm may be used, particularly those devices which are commonly characterized as a "movable wall means."

A coil spring 112 is disposed within the housing 100 between the shoulder 114 on the cap 104 and the annular lug 116 on the valve seat housing 86. The coil spring 112 biases the entire stem assembly 74 upwardly and in turn the ball valve member 66 into seating engagement with the valve seat 68. A coil spring 118 is mounted between the inwardly turned flange 120 on the housing member 102 and the annular lug 116. The spring 118 biases a valve stem assembly downwardly and in turn the ball valve member 66 away from the valve seat 68. As will be explained more fully later on, the springs 112 and 118 are preloaded so that when the ball valve 66 is in its seated position, they exert forces thereon that are equal and opposite and thus cancel each other.

As mentioned previously, one of the foremost features of the subject invention is that the forces generated by the supply pressure and imposed upon the various components of the valve are completely balanced. As shown in FIGURE 2, the supply pressure communicates with the compartment 72 which is defined by the combination of the ball valve 66, valve body 52 and diaphragm 106. The moving parts which would be affected by such pressure and which could generate a condition of imbalance are the exposed surface of the ball valve 66 defined by the valve seat 68 and the area of the diaphragm 106 intermediate the valve body 52 and the stem assembly 74. In this preferred embodiment of the invention, these areas as affected by the supply pressure are substantially equal. As a result of this arrangement, the force generated by the supply pressure on the diaphragm and the ball valve 66 are substantially equal and opposite and, therefore, offset each other so that there is no residual force tending to drive the ball valve and the attached stem assembly in either direction, regardless of the supply pressure.

The remaining forces generated by the pressure within the system are the result of the control pressure. These forces are the effect of the control pressure against the ball valve 66 for an area equal to the valve seat 68 minus that defined by the bore 96. An equal and opposite force is generated by the control pressure against the shoulders 122a and 122b which has an area equal to the effective area of the ball valve 66 minus the area of the bore 96. Since the forces generated against the ball valve 66 and the shoulder 122 by the control pressure are equal and opposite they have a resultant equal to zero so that there is no biasing force as a result thereof against the ball valve 66 or the stem assembly 74.

The remaining pressure generated force is the result of the control pressure as applied to the ball valve 90 on the area defined by the valve seat 92. The control pressure as exerted on the ball 90 constitutes the feed back force of the system and is equal and opposite to the force generated by the bi-metal 30.

As mentioned previously, the springs 112 and 118 are constructed so that when the relay is at its equilibrium position the preloads on the springs are equal and opposite. When the stem assembly 74 is deflected from its normal position to unseat the ball valve 66 the spring 112 will be compressed from its normal condition and the spring 118 expanded from the same. When this happens there will be a differential force resulting from the two springs which will tend to drive the stem assembly 74 to its state of equilibrium in which the ball valve 66 is seated. It is to be noted that it is not necessary that the springs 112 and 118 have the same rate, but only constructed relative to the associated components of the relay so that they are preloaded in the same amounts when the ball valve 66 is seated. Thus, when the stem assembly 74 is in its equilibrium position it is not biased in either direction by the resultant of the springs 112 and 113.

It will be noted that means other than a pair of springs may be used in the relay for returning the ball valve 66 to its seated position. For example a single spring may be used or one or more diaphragms adapted to sense either control or supply pressure.

Referring now to FIGURE 3, the operation of the relay embodying the invention will now be described. When the bi-metallic element 30 senses a decrease in temperature it is bowed downwardly. It is to be noted that the characteristics of the bi-metal are assumed only for purposes of illustration, in that it may be either of the direct or reverse acting type. When it is bowed downwardly the ball valve 90 and the stem assembly 74 along with the ball valve 66 are likewise driven downwardly a corresponding distance. As a result of such movement, the spring 112 is further compressed whereas the spring 113 is relaxed a corresponding amount. As stated previously, the springs are of equal and opposite preloads when the relay is in its equilibrium position but create a resultant force when displaced from such position. As a result of the downward displacement there is a resultant force in an upward direction tending to drive the relay upward to its equilibrium position.

When the ball valve 66 is unseated the supply pressure air is admitted into the control pressure compartment 70, so that there is an increase in the pressure therein and in the motor valve. The increase in pressure is communicated through the bores 96 and 98 in the stem assembly 74 onto the surface of the ball valve 90 defined by the seat 92. As the pressure against the ball 90 increases the feed back force approaches equality with that generated by the bi-metal 30 until they are equal and opposite. As this happens the resultant force from the springs 112 and 113 starts driving the valve member 66 and 90 and the stem assembly 74 upwardly toward the equilibrium position in which the ball valve 66 is in its seated position. As soon as this happens, the supply compartment 74 is closed so that the supply air is no longer communicated to the control pressure compartment 70. Again, the spring members have returned to equal and opposite positions whereby all forces within the relay are substantially balanced including the feed back force which is balanced against the force of the bi-metallic element 30.

Referring now to FIGURE 4 there is shown an illustration of the relay in which the control pressure compartment is exhausted to atmosphere. This condition is brought about by an increase in temperature which causes the bi-metal 30 to bow upwardly. When this happens, the valve 66 and and stem assembly 74 are prevented from upward movement as a result of the seating engagement of the former. The pressure of the control compartment, however, is exerted against the ball valve member 90 which is free to move to the extent that it is brought into engagement with the bi-metal 30. It will be noted that the bi-metal and relay are arranged so that the valve member 90 is retained within the receptacle 88 so as to prevent the former from inadvertently falling out. Since the control pressure is greater than atmosphere, the compartment 70 is exhausted as indicated by the arrows in FIGURE 4. As the compartment 70 is exhausted, the pressure against the ball valve member decreases whereby the feed back force is likewise decreased. When this happens the bi-metal 30 is permitted to unbow since the force exerted against it has been diminished. When the control pressure has decreased a sufficient amount the bi-metal 30 forces the ball valve 90 into seating engagement whereby the exhaust is terminated. When this has happened the relay is again in an equilibrium state.

It can now be seen that the subject invention constitutes a relay or valve in which the forces exerted on the various components thereof are substantially equal and opposite so as to be balanced when the relay is in its equilibrium state. Furthermore, even when out of equilibrium the forces generated by the pressure are nulled out except for the feed back force. As a direct result of this relationship any change, no matter how small, in the bi-metal will cause a corresponding change in the relay. Thus it can be seen that the subject invention substantially eliminates any null or "dead band" that is commonly found in relays of this type. As a direct result, the relay is adapted to be utilized in conjunction with sensing elements which generate forces of relatively small magnitude such as bi-metallic elements. Heretofore, bi-metallic elements have not been particularly suitable with valves of this type because of the imbalance of forces.

Referring back to FIGURE 1 a brief description will now be made of the entire relay assembly 22 including the temperature sensing assembly 20. It is to be noted that the temperature sensing device is merely by way of example and that any means which generates a force signal will be suitable.

As stated previously, the temperature sensing assembly 20 includes a bi-metal of some suitable combination of different metals having different coefficients of expansion. The bi-metal 30 may be of any suitable shape such as a strip which is supported at one or both ends as shown in FIGURE 1, as will be more fully explained hereinafter. In one particular system in which the relay 38 is used it is designed to function for both the heating and cooling operations. In order to achieve this result it was necessary to construct the bi-metal so that it could be double acting or both direct and reverse acting. Thus, the bi-metal when used in a heating system will move in a predetermined manner upon sensing an increase in temperature and in the opposite direction upon sensing a decrease in temperature. Conversely, when the bi-metal is used in a cooling system, an increase in temperature will cause it to move in an opposite direction from that resulting from an increase in temperature during the heating cycle. Moreover, a decrease in temperature will cause it to move in a direction opposite to that caused by decrease in the temperature when used in a heating system. For a more complete description of the construction of the temperature sensing assembly reference is again made to the aforementioned copending application.

As mentioned previously, the temperature sensing assembly 20 in addition to the bi-metal 30 includes the selective support assembly 42 and the pneumatic drive assembly 40. The support assembly 42 is adapted to selectively move in and out of engagement with the end of the bi-metal 30. The support assembly 42 includes a fixed post member 150 which is secured to the casing 24 by means of the leaf spring 152. The leaf spring may be mounted in any suitable fashion such as by the screw members 154. A slidable post member 156 is secured to the fixed post member 150 by means of the spaced rivets 158. The rivets 158 extend through the slot 160 so as to permit movement of the post member 156 with respect to the post member 150. A spring washer 162 is disposed intermediate the heads of the rivets 158 and the post member 156 so as to bias the latter into frictional engagement with the post member 150. Each of the posts 150 and 156 is provided with a right angle section 164 and 166 which includes the apertures 168 and 170. A screw member 172 extends through the aperture 168 and is threadably received in the aperture 170 for adjusting the slidable post member 156 with respect to the fixed post member 152, as can readily be seen from FIGURE 1.

The post member 156 is provided with an aperture 176 for receiving the ball member 174 which is secured to the end of the bi-metal 30. The ball member 174 facilitates the engagement of the bi-metal 30 by the post assembly 42 when it is desired to support both ends thereof. It will be noted that the post assembly 42 is biased toward the engaging position by the spring 177 attached to the post 150 and the casing 24.

As will be explained hereinafter, the selective post assembly 42 is adapted to be positioned so as to either engage the end of the bi-metal as shown in FIGURE 1, or to disengage the same as indicated by the dotted lines shown in the same figure. The operation of the bi-metal in combination with the post assembly 42 will now be described. For example, the bi-metal 30 may be constructed so that when it is engaged at both ends an increase in temperature will cause it to bow upwardly. Thus, when it is engaged at only one end the same temperature increase will cause it to bow downwardly. Still further, a decrease in temperature when supported at both ends will cause the bi-metal to bow downwardly but when supported at only one end the same decrease will cause it to bow upwardly. As a result of this arrangement it is possible to achieve the double acting characteristics mentioned previously.

The selective post assembly may be positioned by any suitable means of which one is shown in FIGURE 1 and will now be briefly described. It is the general practice in air conditioning systems which are to function both for purposes of heating and cooling that the supply pressure for the two operations will be measurably different. For example, a system may utilize 18 p.s.i. supply air during the heating operation and 22 p.s.i. supply air during the cooling operation. The different pressures are usually effected by a manual change in the system made during the spring and fall seasons of the year when the systems are switched between heating and cooling.

The drive assembly 40 is constructed so as to take advantage of the different supply pressures used in the operation of a heating and cooling air conditioning system. The drive assembly 40 is connected to the supply pressure by means of the passage 180 which communicates with the chamber 26 and in turn the passage 62 and port 32. The drive assembly includes the bore 182 which extends through the casing 24 and a cylinder body 184 received in a portion of the bore. The cylinder body 184 is provided with suitable annular grooves 186 and sealing members 188 for providing sealing engagement. The cylinder body 184 is provided at one end with the bore 190 which forms a receptacle for a valve assembly 192 and is provided with supply pressure through the passage 180. A passage 194 extends from the bore 190 to the passage 196 which in turn communicates with the annular space 198 surrounding the cylinder body 184 intermediate the sealing members 188. The annular space 198 in turn communicates with the diaphragm assembly 200 through the passage 202. The passage 194 is partially closed at its other end by the needle valve 204 which permits a controlled bleed to atmosphere.

The end of the cylinder body 184 engages a flexible annular diaphragm 206 at its outer edge so as to clamp the same between it and the cooperating shoulder on the casing 24 as shown in the drawing. The diaphragm 206 serves to seal off the bore 200 so as to define a normally closed chamber which may be selectively opened. The valve assembly 192 is mounted on the diaphragm 206 and comprises a valve body 208 which is fastened to the diaphragm by means of a lug 210. The valve body 208 is provided with the cavity 212 into which is pressed a ball valve member 214. The ball valve member cooperates with the valve seating surface 216 located at the end of the passage 194. The entire valve assembly 192 is biased toward the seated position by means of the coil spring 218 which is disposed intermediate the shoulder 210 and the adjusting cap 220. The adjusting cap is received within the threaded portion 222 of the bore 182 and may be threadedly positioned therein so as to vary the preload of the spring 218. When the ball valve 214 is unseated, the supply pressure is communicated to the passage 194 and, as explained previously, to the drive diaphragm assembly 200.

The effective area of the diaphragm 206 is such that the force exerted by spring 218 is greater than the force generated by the lower of the two supply pressures acting against the diaphragm. Therefore, the ball valve remains in the seated position so that there is no communication of pressure to the drive diaphragm assembly. When this happens, the pressure within the passage 194, 196 and chamber 208 is atmospheric as a result of the needle valve 204. At the higher of the two pressures the effective area of the diaphragm is such that the force generated against it is sufficiently great to overcome the force of the spring 218 and to lift the ball 214 from its seat. When this happens the drive diaphragm assembly is in communication with the supply pressure.

The diaphragm assembly 200 includes the cylindrical cavity 226 in the casing 24 having the reducer diameter bore 228. A diaphragm member 230 is stretched across the bore 228 and held in place at its periphery by means of the ring 232. A post member 234 is affixed to the diaphragm 230 in any suitable fashion. The other end of the post member 234 is provided with a reduced diameter portion 236 which is press fitted into an appropriate aperture 238 in the fixed post member 150.

It can now be seen that when the system is operating at the lower of the two pressures, the diaphragm 230 will be subjected to substantially atmospheric pressure on both sides. Therefore, the force of the spring 177 will bias the post assembly 42 into engagement with the ball 174 on the end of the bi-metal 30. On the other hand when the system is operating at the higher pressure the diaphragm will be forced toward the right and in turn cause the post assembly 42 to be moved a corresponding distance toward the right out of engagement with the bi-metal 30 and ball 174. When the system should be returned to the lower pressure the ball valve 214 will again seat so that the diaphragm 230 will be returned to its repose condition as a result of the bleed valve 204. As a result of this unique arrangement it is possible to construct a double acting sensing means out of a single bi-metal.

The system may be set for some predetermined equilibrium temperature by means of the preset assembly generally denoted by the numeral 250 and as can be seen in FIGURES 1, 5 and 6. The preload assembly comprises a yoke 252 which is substantially rectangular in cross section and is attached at its upper end 254 to the end of the bi-metal 30. The sides of the yoke 256 embrace the end of the casing 24 and are secured at the lower end to the adjusting knob assembly 256. The adjusting knob assembly consists of the knob 258 which is provided with a thread stem 260 which is mounted in a channel shaped bracket 262. The assembly 256 is secured to a spring member 264 by means of a link 266 which is threadably mounted at one end on the screw 260. The coil spring 264 is secured at its other end to the casing 24 by means of the hook 268. It can be seen that the coil spring 264 by means of the yoke 252 imposes a moment upon the bi-metal which permits the positioning of the same with respect to the relay 38 to establish an approximate equilibrium temperature and control pressure. The magnitude of the moment may be varied by shortening the distance between the lower end of the yoke 252 and the coil spring 264 by the turning of the screw member 260 so as to cause the link 266 to move to the right. The adjustment of the moment will in turn provide a similar adjustment of the equilibrium temperature and control pressure. The moment will be imposed on the bi-metal whether it is reverse of direct acting and will operate in substantially the same manner.

The relay assembly 22 may be further provided with a calibrated temperature control device (not shown) for adjusting the equilibrium temperature to some desired level. For example, a calibrated knob may be secured to the hook member 268 by some suitable mechanical linkage which will in turn vary the amount of preload exerted upon the spring 264 and in turn impose a like variation in moment upon the bi-metal 30.

Referring now to FIGURE 5 there is shown the relay assembly 22 in elevation with its various components. The casing 24 as shown in FIGURE 5 is provided with the ports 270 and 272 which communicate with the supply pressure and control pressure chambers, respectively, and permit the insertion of suitable pressure devices for the calibrating and testing of the relay assembly 22. Normally, the ports 270 and 272 are closed by means of plugs 274.

The relay assembly may be mounted in any suitable fashion such as in the metal cage shown in FIGURES 6 and 7. The cage consists of a plate 276 which is mounted within the air conditioning unit. A shield 278 covers the relay assembly except for the bi-metallic element 30 and the control ports 270 and 272, as a result of the access openings 280 and 282. An opening 284 is provided in the mounting plate 276 similar to opening 280. The openings 280 and 284 permit the flow of the ambient atmosphere across the bi-metal 30 so as to insure that a representative sample of the ambient atmosphere is continually brought into contact with the temperature sensing element. The opening 282 permits access to the ports 270 and 272 without the necessity of removing the shield 278.

Referring now to FIGURE 9 there is shown a modification of the relay embodying the invention. The modification includes a casing 300 having a bore 302 extending therethrough. The casing is provided with the supply pressure port 304 and a control pressure port 306. The supply port 304 communicates with the supply pressure compartment 308 and the control pressure port 306 with the control pressure compartment 310. The compartments 308 and 310 are separated by the partition 312 having the aperture 314 therein for permitting flow between the two. A ball valve 316 is disposed within the control pressure compartment 310 and is adapted to engage the valve seat 318 formed adjacent the aperture 314.

The supply compartment is sealed at its other end by means of the diaphragm 320 which is connected to the ball valve 316 by means of the stem 322. A second diaphragm 324 is secured at its edges by the casing 300 and cooperates with the diaphragm 320 to form a compartment 326 which is vented to atmosphere by means of the ports 328. The diaphragms 320 and 324 are mechanically connected by means of the stem 330 so as to move with the ball valve 316. The stem 330 projects through the diaphragm 324 and a ball valve 332 is secured to the end thereof. The ball valve 332 is adapted to cooperate with a valve seat housing 334 which is secured to a third diaphragm 336 which extends across the bore 302.

The diaphragms 324 and 336 from a compartment 337 which receives control pressure from the compartment 310 as indicated by the arrows. The valve seat housing 334 comprises the seat 338 positioned at one end of the tube 340 which extends through the diaphragm 336 and is open to atmosphere.

The entire valve stem assembly is biased by the opposing springs 342 and 344. When the valve 316 is seated the springs 342 and 344 exert substantially equal and opposite forces upon the valve stem assembly so as to effectively null out each other's force. The spring 342 engages the adjustable cap member 346 which is threadably secured within the bore 302.

In order to balance the forces resulting from the supply and control pressures, it is necessary that certain relationships be observed with regard to the movable members that are subjected to such pressures. Firstly, with regard to the supply pressure it can be seen that in the supply compartment 308 that the area of the ball valve 316 defined by the valve seat 318 must be substantially equal to the effective area of the diaphragm 300. When this is the case the forces generated by a supply pressure against the ball valve 316 and the diaphragm 300 will be substantially equal and opposite so as to cancel each other.

To balance the forces generated by the control pressure it is necessary that the same be communicated to the compartment 337 which is defined by the diaphragm 324 and 336. In order to offset the effect of the control pressure against the ball valve member 316 it is necessary to construct the diaphragm member 324 to have an effective area substantially equal to that defined by the valve seat 318. Thus, the forces generated by the control pressure acting on the ball valve 316 and the diaphragm 324 would be equal and opposite so as to cancel each other out.

The only remaining force would be the effect of the control pressure on the diaphragm 336. This force would constitute the feed back force and would be imparted to the exhaust tube 340 which would in turn act against the bi-metallic element 30. Thus it can be seen that the valve stem assembly is completely free of any unbalanced forces when in equilibrium whereby the slightest force exerted by the temperature sensing element would cause either the ball valve 316 to open or the valve seat 338 to move away from the ball valve member 332.

The operation of the valve is essentially the same as that previously described so that only a few brief remarks are necessary. Essentially, when a force is applied toward the left on the tube 340 the valve stem assembly is moved in a like direction so that the ball valve 316 is lifted from its seat. Thus the supply pressure is communicated to the chamber 310 and the chamber 337. The increase in control pressure increases the feed back force so that it approaches equality with that generated by the temperature sensing element. The differential force generated as a result of the displacement of the coil springs 342 and 344 then tends to drive the valve 316 back into its seated position. Conversely, if the force normally exerted on the tube 340 is diminished the feed back force will lift the housing 334 from the ball valve 332 so that the control pressure is exhausted to atmosphere. As the control pressure decreases, the feed back force on the diaphragm 336 is decreased to the point that the temperature sensing element drives the housing 334 back into its seated position.

It will be apparent that the two modifications described herein are merely exemplary of the manner in which the inventive concepts may be applied. Therefore, it is to be understood that such modifications are merely by way of example and are not to be construed as limitations. Accordingly, it is submitted that certain modifications may be made within the scope of the inventive claims without departing from the spirit of the invention.

It is claimed:

1. A relay comprising a casing having first and second compartments in which said first compartment is connected to a source of supply pressure and said second compartment is under control pressure, valve seat means for selectively connecting said first and second compartments, first valve means disposed in said second compartment cooperating with said valve seat means for selectively connecting said first and second compartments to permit flow therebetween, a flexible wall means mounted in said first compartment and partially defining the same for sensing said supply pressure to generate a force equal and opposite to that generated by said supply pressure on said first valve means, a stem means connected at one end to said first valve means and connected to and extending through said flexible wall means, said flexible wall means supporting said stem means in a spaced relationship from said casing, whereby the forces imposed by said supply pressure on said first valve means and said flexible wall means cancel each other, means on said stem means for sensing said control pressure for generating a force equal and opposite to that force imposed by said control pressure on said first valve means whereby the forces imposed by said control pressure on said first valve means and said means cancel each other, an exhaust passage extending through said stem and being open at one end to said second compartment and open at the other end to atmosphere, second valve means cooperating with said exhaust passage for controlling the exhaust, and condition sensing means engaging said second valve means for biasing the same toward its seated position and in turn for selectively disengaging said first valve means from said valve seat means in accordance with variations in the sensed condition, said second valve means sensing control pressure to generate a feed back force thereon in opposing relationship to the force exerted by said condition sensing means on said second valve means for biasing the same toward its seated position, said feed back force being substantially equal to that force exerted by said condition sensing means on said second valve means when said relay is in a state of equilibrium, and means for biasing said first valve means toward its seated position.

2. A relay comprising a casing having first and second compartments in which said first compartment is connected to a source of supply pressure and said second compartment is under control pressure, valve seat means connecting said first and second compartments, first valve means disposed in said second compartment cooperating with said valve seat means for selectively connecting said first and second compartments to permit flow therebetween, a flexible wall means mounted in said first compartment and partially defining the same for sensing said supply pressure to generate a force equal and opposite to that generated by said supply pressure on said first valve means, a stem means connected at one end to said first valve means and connected to and extending through said flexible wall means, said flexible wall means supporting said stem means in a spaced relationship from said casing, whereby the forces imposed by said supply pressure on said first valve means and said movable wall means cancel each other, means on said stem means for sensing said control pressure for generating a force equal and opposite to that force imposed by said control pressure on said first valve means whereby the forces imposed by said control pressure on said first valve means and said means cancel each other, an exhaust passage extending through said stem and being open at one end to said second compartment and open at the other end to atmosphere, second valve means cooperating with said exhaust passage for controlling the exhaust, and condition sensing means engaging said second valve means for biasing the same toward its seated position and in turn for selectively disengaging said first valve means from said valve seat means in accordance with variations in the sensed condition, said second valve means sensing control pressure to generate a feed back force thereon in opposing relationship to the force generated by said condition sensing means on said second valve means for biasing the same toward its seated position, said feed back force being substantially equal to that force exerted by said condition sensing means on said second valve means when said relay is in a state of equilibrium, and means actuated upon the unseating of said first valve means for biasing the same toward its seated position, said means imposing a substantially zero biasing force when said first valve means is seated.

3. In a relay, the combination comprising a casing having first and second compartments in which said first compartment is connected to a source of supply pressure and said second compartment is under control pressure, valve seat means connecting said first and second compartmets, valve means disposed in said second compartment cooperating with said valve seat means for selectively connecting said first and second compartments to permit flow therebetween, a diaphragm means mounted in said first compartment and partially defining the same for sensing said supply pressure to generate a force substantially equal and opposite to that generated by said supply pressure on said valve means, a stem means mounted within said casing and connected at one end to said valve and connected to and extending through said diaphragm means, said diaphragm means supporting said stem means in a spaced, substantially coaxial, relationship from said casing, whereby the force imposed by said supply pressure on said valve means and on said diaphragm means cancel each other, and mean on said stem means for sensing said control pressure for generating a force equal and opposite to that force imposed by said control pressure on said valve mean whereby the forces imposed by said control pressure on said stem means cancel each other.

4. A relay comprising a casing having first and second compartments in which said first compartment is connected to a source of supply pressure and said second compartment is under control pressure, valve seat means connecting said first and second compartments, first valve means disposed in said second compartment cooperating with said valve seat means for selectively connecting said first and second compartments to permit flow therebetween, a diaphragm means mounted in said first compartment and partially defining the same for sensing said supply pressure to generate a force equal and opposite to that generated by said supply pressure on said first valve means, a stem means mounted within said casing and connected at one end to said first valve means and connected to and extending through said diaphragm means, said diaphragm means supporting said stem means in a spaced, substantially coaxial, relationship from said casing, whereby the forces imposed by said supply pressure on said first valve means and on said diaphragm means cancel each other, means on said stem means for sensing said control pressure for generating a force equal and opposite to that force imposed by said control pressure on said first valve means whereby the forces imposed by said control pressure on said first valve means and said means cancel each other, an exhaust passage extending through said stem and being open at one end to said second compartment and open at the other end to atmosphere, second valve means cooperating with said exhaust passage for controlling the exhaust, a condition sensing means engaging said second valve means for biasing the same toward its seated position and in turn for selectively disengaging said first valve means from said valve seat means in accordance with variations in the sensed condition, said second valve means sensing control pressure to generate a feed back force thereon on opposing relationship to the force generated by said condition sensing means on said second valve means when said relay same towards its seated position, said feed back force being substantially equal to that force exerted by said condition sensing means on said second valve means when said relay is in a state of equilibrium, and means actuated upon the unseating of said first valve means for biasing the same toward its seated position, said means imposing a substantially zero biasing force when said first valve means is seated.

References Cited by the Examiner
UNITED STATES PATENTS

| | | | |
|---|---|---|---|
| 843,093 | 2/07 | Nash. | |
| 2,324,690 | 7/43 | Gardiner | 137—627.5 X |
| 2,459,456 | 1/49 | Rockwell | 137—627.5 |
| 2,918,074 | 12/59 | Taplin | 137—86 |

M. CARY NELSON, *Primary Examiner.*

LAVERNE D. GEIGER, WILLIAM F. O'DEA,
*Examiners.*